No. 784,981. PATENTED MAR. 14, 1905.
D. J. BUCKLEY.
HAIR DRIER.
APPLICATION FILED SEPT. 10, 1904.
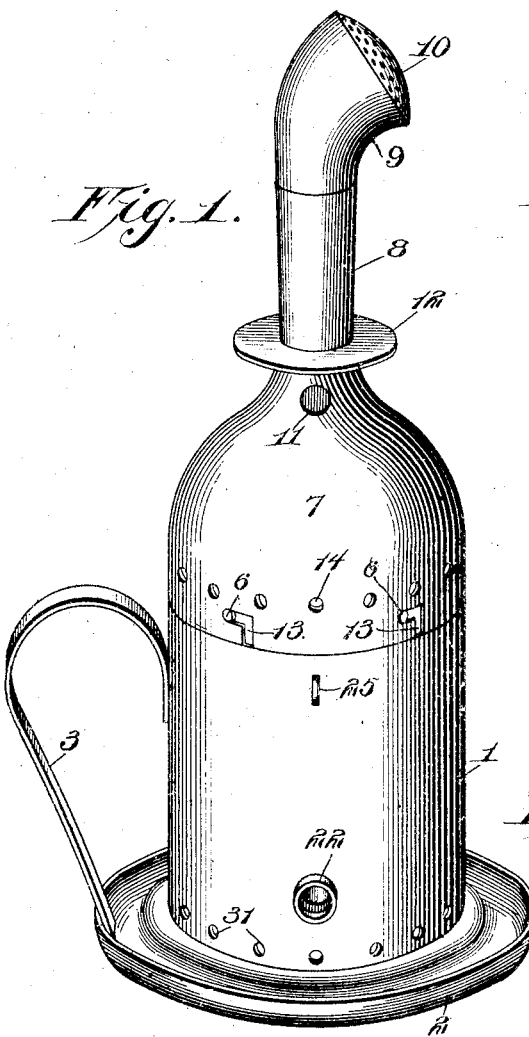
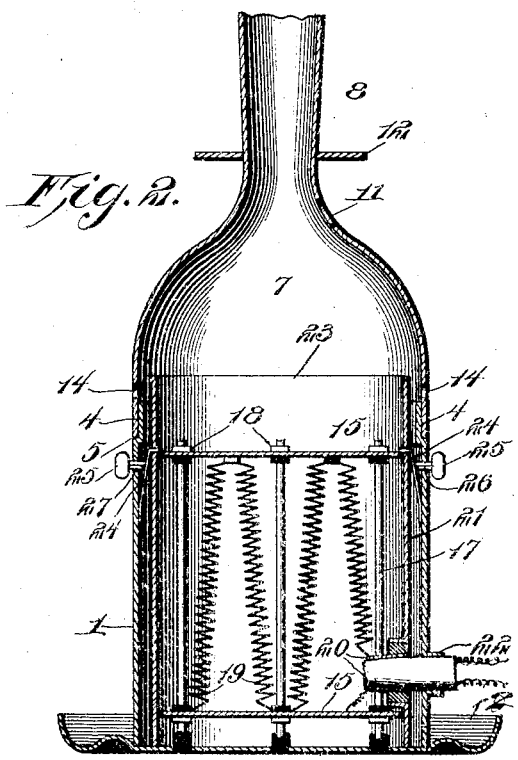
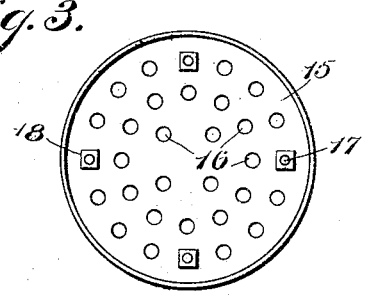
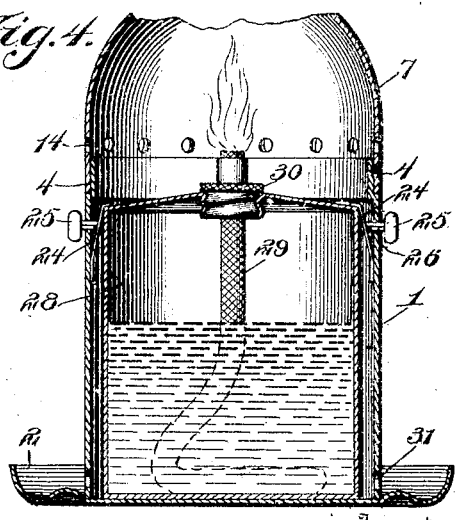
Witnesses
Louis D. Heinrichs
K. Allen
Inventor
Daniel J. Buckley,
By Victor J. Evans
Attorney No. 784,981. Patented March 14, 1905.

UNITED STATES PATENT OFFICE.

DANIEL J. BUCKLEY, OF NEWBURYPORT, MASSACHUSETTS.

HAIR-DRIER.

SPECIFICATION forming part of Letters Patent No. 784,981, dated March 14, 1905.

Application filed September 10, 1904. Serial No. 224,004.

*To all whom it may concern:*

Be it known that I, DANIEL J. BUCKLEY, a citizen of the United States, residing at Newburyport, in the county of Essex and State of Massachusetts, have invented new and useful Improvements in Hair-Driers, of which the following is a specification.

This invention relates to an improvement in hair-driers, comprehending specifically a shell of particular construction arranged to receive the usual oil-heater or an electric heater.

The invention is illustrated in the accompanying drawings, in which—

Figure 1 is a perspective view of the drier of my invention. Fig. 2 is a broken vertical central section of the same, showing the drier combined with an electric heater. Fig. 3 is a bottom plan of the electric-heating apparatus. Fig. 4 is a broken vertical section of the drier, showing the shell combined with an oil-heater.

Referring to the drawings, my improved heater comprises a cylindrical body portion 1, having an ornamental base 2 and a handle 3, the handle being secured to the base and to the body portion as illustrated. The body is reduced at the upper end, as at 4, to provide a shoulder 5, the reduced portion having laterally-projecting pins 6.

The upper part of the heater comprises a cylindrical shell 7, having a reduced and extended neck 8, the free end of which is bent laterally, as at 9, and provided with a perforated guard-plate or screen 10. The mouth end 9 of the neck is preferably separate from the neck proper, thus permitting substitution of any desired form of outlet required. If preferred, the neck 8 may be separate from the shell 7 and may be made in sections arranged to be connected in any desired manner. The shell at the junction with the neck 8 is preferably formed with an opening 11 to permit the introduction of any suitable tool into the heated zone, a guard-flange 12 surrounding the neck just above the opening 11. On the lower end the shell, which is of a size to snugly fit the extended portion 4 of the body, is formed with bayonet-grooves 13 to receive the pin 6, whereby to secure the shell and body portion together. The lower edge of the shell rests upon the shoulder 5 when the parts are assembled, presenting the smooth unbroken interior surface. The shell just above the limit of the extended portion 4 of the body 1 is formed with a circumferential row of air-inlets 14, as clearly shown in the drawings.

The electric heater designed for use with the shell described comprises plates 15, perforated and spaced apart by rods 17, which rods are held in fixed relation to the plates by locknuts 18. The rods 17 project below the lower plate 15 to serve as legs to support the heater from the bottom of the body portion 1. Resistance-coils 19 are arranged intermediate and connected to the plates 15, being preferably arranged in single circuit, with their terminals engaging the usual socket connection 20, formed in one side wall of the heater-casing 21, which casing surrounds the coils in the manner shown. A flanged opening 22, formed in the body 1 adjacent the socket-opening 20 in the heater-casing, serves to permit the introduction of the usual socket to energize the coils, as will be understood. The heater-casing 21 extends above the upper plate 15, as at 23, which extension is of sufficient type to project beyond and practically close the air-inlets 14, formed in the shell 7. Spring-catches 24, secured at one end to the body 1 and having hook-terminals to engage openings 25 formed in the heater-casing 21 serve to secure the heater against accidental displacement. Catches are preferably operated by heated pins 25, carrying keys 26, and fitting keyhole-openings 27, formed in the body 1.

In Fig. 4 the heating medium is illustrated as the usual oil-cup 28, carrying the wick 29 and adjusting means 30, the cup 28 being of a size to fit within the body portion 1, with the upper edge thereof arranged to be engaged by the catches 24. Air-inlet openings 31 are formed in the body portion 1 of the drier adjacent the base 2. It will be noted that in the use of the oil-heater the air-inlets 14 are not covered, permitting the necessary air-supply.

The structure described is readily adapted for the purpose designed, being effective in the use of oil-burner or the electric heater described. In the use of the electric heater it will be noted that the flange or extension 23 serves to practically cut off the air-inlets 14, directing the heat into the neck 8 while the oil-burner is arranged to draw the necessary air-supply through these inlets.

The heater is readily adapted for use with either oil or electricity as the heater medium, the main feature of the invention residing in the means by which either the oil-burner or electric heater may be held within the drier against accidental movement.

Having thus described the invention, what is claimed as new is—

1. A hair-drier comprising a body portion, a shell having a screened outlet removably secured to the body portion, an electric heater within the body portion, the body portion being formed with air-inlets below the heater, and means to removably secure the heater within the body.

2. A hair-drier comprising a body portion, a shell having a screened outlet removably secured to the body portion, an electric heater within the body portion, said heater comprising perforate plates, and resistance-coils joining the plates, means for making electric connection through the body portion, and catches for removably securing the heater within the body portion.

3. A hair-drier comprising a casing having a screened outlet, an electric heater removably held within the casing, said heater comprising an upper and a lower plate, rods connected to the plates and holding them spaced apart, resistance-coils connected to the plates, and means for making electric connection with said coils through the body portion.

In testimony whereof I affix my signature in presence of two witnesses.

DANIEL J. BUCKLEY.

Witnesses:
  JERE W. BUCKLEY,
  DAVID P. PAGE.